United States Patent [19]

Migliori

[11] Patent Number: 4,489,370
[45] Date of Patent: Dec. 18, 1984

[54] HIGH CAPACITY DC-DC VOLTAGE CONVERTER SUITABLE FOR CHARGING ELECTRONIC CAMERA FLASH LAMPS

[75] Inventor: Albert Migliori, Santa Fe, N. Mex.

[73] Assignees: Melvin A. Pfaelzer; Philip M. Casady, both of Santa Fe, N. Mex.

[21] Appl. No.: 422,012

[22] Filed: Sep. 23, 1982

[51] Int. Cl.³ .......................................... H02M 3/335
[52] U.S. Cl. ..................................... 363/26; 363/134
[58] Field of Search ....................... 363/15, 16, 24, 25, 363/26, 123, 125, 127, 131, 132, 133, 134

[56] References Cited

U.S. PATENT DOCUMENTS 4,070,701  1/1978  Harnden, Jr. et al. ............. 363/134

OTHER PUBLICATIONS

P. Regan & P. Dewsbury, "Designs for VMOS Push-Pull Converters," May 1980, Electronic Engineering, vol. 52, No. 638, pp. 87–92, 96.

Primary Examiner—William M. Shoop
Assistant Examiner—Anita M. Ault
Attorney, Agent, or Firm—William A. Eklund

[57] ABSTRACT

A portable, battery-powered high capacity dc-dc voltage converter suitable for charging capacitor-based devices such as electronic camera flash lamps is disclosed. The voltage converter utilizes two high frequency metal oxide semiconductor field effect power transistors which are driven in a push-pull arrangement by an emitter-follower full wave bridge circuit. The transistors drive a low leakage inductance toroidal ferrite-core power transformer at a frequency which is sufficiently high to avoid saturation of the transformer, resulting in high efficiency and low power consumption. The output of the transformer is rectified to produce a high capacity dc charging signal on the order of 300 volts with a maximum current of 28 amps. The voltage converter is capable of recharging commercially available inexpensive electronic 100-watt flash lamps at a rate of once every 1.8 seconds, compared with a rate of 15 seconds for comparable prior art self-contained charging units.

6 Claims, 2 Drawing Figures

HIGH CAPACITY DC-DC VOLTAGE CONVERTER SUITABLE FOR CHARGING ELECTRONIC CAMERA FLASH LAMPS

BACKGROUND OF THE INVENTION

The invention disclosed herein is generally related to voltage converters, particularly battery-powered dc-dc voltage converters of the type commonly used to charge capacitance-based electrical storage devices. More specifically, the present invention is related to battery-powered voltage converters for charging electronic camera flash lamps.

Commercially available electronic camera flash lamps are typically driven by capacitance-based electrical storage devices which must be recharged after each flash. Such storage devices are typically recharged by means of a portable, battery-powered dc-dc voltage converter which is either contained separately or included integrally in the flash lamp unit. The time required for recharging the flash lamp between flashes is limited primarily by the power output of the voltage converter. Typical integrally contained voltage converters powered by commonly available low voltage batteries require 10 to 20 seconds to recharge a typical flash unit, a time period which is unacceptably long in many professional photographic applications. More expensive professional quality flash units utilize separately contained voltage converters which have a higher power output, but which are more complex and bulky. Other commercially available charging devices require high voltage batteries that are often not readily available.

Previously available voltage converters used in connection with camera flash lamps are also characterized by the emission of an audible, high pitched acoustic tone during the recharging period. This tone results from saturation of the power transformer typically present in the converter circuit, and is undesirable in certain professional applications, for example during press conferences.

Accordingly, it is the object and purpose of the present invention to provide a high capacity dc-dc voltage converter. More specifically, it is the object of this invention to provide a voltage converter suitable for use in charging rechargeable capacitor-based devices of the type commonly used to power electronic camera flash lamps.

It is also an object of the present invention to provide such a voltage converter adapted for use as a portable, compact power supply for recharging a camera flash unit in the field.

It is another object of the present invention to provide a high capacity voltage converter suitable for charging electronic camera flash units, and which utilizes relatively inexpensive and commonly available low voltage rechargeable batteries.

It is yet another and more specific object of the present invention to provide a battery-powered charging device for recharging electronic camera flash lamps, which recharges such lamps quickly and without emission of audible sound.

SUMMARY OF THE INVENTION

In accordance with the objects and purposes set forth above, the dc-dc voltage converter of the present invention includes a signal generator that operates to produce a pair of pulse trains which have a frequency on the order of 100 kilohertz and which are 180 degrees out of phase with one another. These pulse trains are applied by an emitter-follower full wave bridge circuit to the respective inputs of a pair of high frequency metal oxide semiconductor field effect power transistors, which are preferably N-channel enhancement mode transistors. The phased outputs of the power transistors are applied to the opposite ends of the primary coil of a power transformer having a center tap connected to a source or relatively low voltage dc current. In accordance with one aspect of the the invention, the transformer is a toroidally wound ferrite core transformer in order to obtain high power conversion efficiency with low leakage inductance. The high voltage alternating current produced in the secondary coil of the transformer is rectified and filtered to produce a high power dc output signal suitable, for example, for charging an electronic camera flash unit.

An important aspect of the invention is the use of an operating frequency that is sufficiently high to ensure that the power transformer is not saturated during operation. This prevents the development of transient current excursions, or spikes, in the primary coil of transformer, which commonly result in decreased power conversion efficiency and lower power output in previously known voltage converters operating at lower frequencies for a given transformer mass. Also, because saturation is prevented and transient current spikes are minimized, and further because of the high operating frequency, the transformer is silent during operation.

In accordance with other aspects of the invention, the high frequency power transistors are protected against voltage transients by employing zener diodes and snubber networks connected in parallel to the input and output of each power transistor.

The power transformer is toroidal and preferably may be bifilarly wound for the purpose of obtaining optimum high power conversion efficency and low leakage inductance. This improves the overall performance of the converter and also further minimizes voltage transients that might damage the power transistors.

In accordance with another aspect of the invention, the voltage converter further includes a battery-saving circuit which operates to automatically turn off the converter when charging is completed. This circuit operates to compare the output voltage of the converter against an internally generated reference voltage and to switch the converter off when the output voltage exceeds the reference voltage by more than a predetermined amount.

These and other features of the present invention are more fully set forth in the following detailed description of the preferred embodiment, which is described with reference to the accompanying drawings.

BRIEF DESCRIPTION OF THE DRAWINGS

The accompanying drawing, which is incorporated in and forms a part of the specification, illustrates the preferred embodiment of the present invention and, together with the following description, serves to explain the principles of the invention. In the drawing.

DETAILED DESCRIPTION OF THE PREFERRED EMBODIMENT

Figure 1A:
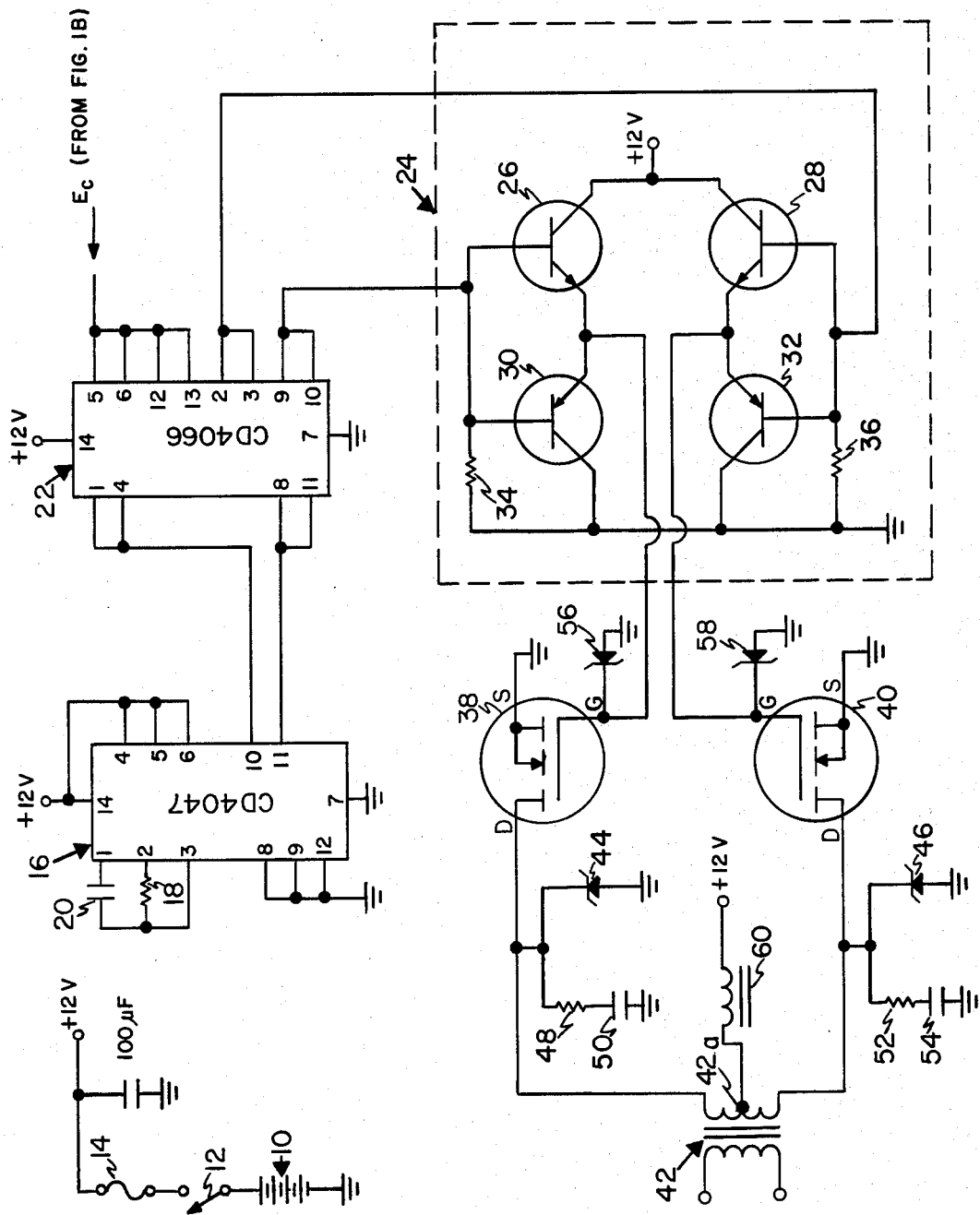
FIGS. 1A–1B is a schematic electrical diagram of the high capacity dc-dc voltage converter of the present invention.

FIG. 1 is a schematic electrical diagram illustrating the preferred embodiment of the voltage converter of the present invention. The voltage converter is powered by a pair of rechargeable 6-volt gel cell batteries 10 which are connected in series to provide 12 volts. In the preferred embodiment these are Yuasa NP1.2-6 batteries, which are selected over comparable nickel-cadmium batteries due to their lower cost, superior durability and greater resistance to abuse. The 12-volt dc power signal is applied to the various parts of the electronic circuitry described below through an on-off switch 12 and a 20 amp fuse 14.

A pair of 100 kHz time base signals are generated by a CMOS integrated circuit 16, specifically, an RCA CD 4047 integrated circuit. The 4047 IC is an astable monostable multivibrator that is configured with a 19.6 kilohm resistor 18 across pins 2 and 3, and a 120 picofarad capacitor 20 across 1 and 3, which set the frequency of the outputs at 100 kHz. The outputs on pins 10 and 11 of the multivibrator consist of two 100 kHz square wave pulse trains, each having a fifty percent duty cycle. These pulse trains are 180 degrees out of phase with one another. The two pulse trains are applied to an electronic switch 22 which forms one part of a battery-saving voltage regulating circuit, described further below. In the preferred embodiment the switch 22 is an RCA CD 4066 quad bilateral switch IC. The four switches of the quad switch are doubled up in parallel to ensure adequate current capacity in the switch. Toggling of the switch 22 is controlled by a control input signal $E_c$ which is applied simultaneously to each of the four control input pins 5, 6, 12 and 13 of the switch 22.

An emitter-follower full wave bridge circuit 24 is employed to turn alternately on and off a pair of high frequency power transistors, which are discussed further below. Such a bridge circuit is utilized because it is capable of providing a high momentary charging current to the power transistors. The bridge circuit includes an array of four small-signal transistors 26, 28, 30 and 32, two of which (26 and 28) are 2N3511 NPN transistors and two of which (30 and 32) are 2N2894 PNP transistors. The NPN and PNP transistors 26 and 30 are connected in an emitter-follower arrangement, and the NPN and PNP transistors 28 and 30 are likewise connected. Specifically, one pulse train signal from the switch 22 is applied to the connected bases of the transistor pairs 26 and 30, and the other pulse train from the switch 22 is applied to the connected bases of the transistors 28 and 32. A pair of 10 kilohm resistors 34 and 36 are interposed between electrical ground and the connected bases of the transistor pairs 26-30 and 28-32, respectively. The collectors of the PNP transistors 30 and 32 are connected to ground, and the collectors of the NPN transistors 26 and 28 are connected to the +12 volt dc battery power signal. The emitters of the NPN/PNP transistor pair 26 and 30 are connected together and provide one output signal from the circuit 24, and the emitters of the transistor pair 28 and 32 are likewise connected together to provide the other output signal from the circuit 24. The result is that the voltages of the output signals from the bridge circuit are the same as the input voltages from the multivibrator and the electronic switch, but with a much higher current capacity. Also, in addition to transmitting the +12 volt dc signal from the batteries to the power transistors during the periods when the power transistors are switched on, the bridge circuit 24 acts as a drain to connect the input gates of each of the power transistors to ground during the periods when the signal to the power transistor is turned off. That is, the bridge circuit has both source and sink characteristics. During the turn-on time of the circuit, which is approximately 30 nanoseconds in duration, the circuit operates to effectively connect the gate of the respective power transistor directly to the +12 volt battery, thereby rapidly charging the gate of the power transistor. Once charged, no further current flows.

The output signals from the emitter-follower circuit 24 are applied to the input gates of a pair of high frequency power transistors 38 and 40. More specifically, the power transistors 38 and 40 are high frequency, N-channel enhancement mode, metal oxide semiconductor field effect transistors (MOSFETs). In the preferred embodiment, these transistors are 100 volt, 28 amp power transistors manufactured by International Rectifier Corporation under the part name IRF 150. These transistors are driven in a push-pull arrangement by the bridge circuit described above.

The power transistors 38 and 40 operate to take current from the batteries and pass it through a power transformer 42. More specifically, the power transistors operate to draw current in alternating directions through the primary winding of the transformer from a center tap 42a to which the +12 volt battery power supply is connected. The power transistors thus act as switches to function in a push-pull arrangement to draw current through the power transformer in opposite directions at a frequency of 100 kHz. Together the two power transistors 38 and 40 and the power transformer 42 act as an inverter circuit having an efficiency of approximately 80 percent.

At an operating frequency of 100 kHz, the transition periods of the power transistors are very short, on the order of 100 nanoseconds. Consequently, transients may develop because of leakage inductance in the transformer. Such leakage inductance can cause very large voltage spikes, on the order of thousands of volts. The MOSFET power transistors are sensitive to and can be damaged by such voltage spikes. Therefore, to protect the power transistors, a pair of zener diodes 44 and 46 are interposed between ground and the drain terminals D of the respective transistors 38 and 40, together with what are called snubber networks. In the case of the transistor 38, the snubber network consists of a very low resistance (20 ohm) two-watt resistor 48 and a very low capacitance (0.01 microfarad) capacitor 50, which are connected in series and which are interposed between ground and the drain terminal D of the transistor 38. An identical snubber network consisting of a 20 ohm resistor 52 and a 0.01 microfarad capacitor 54 is connected to the drain terminal D of the power transistor 40. Additionally, a pair of zener diodes 56 and 58 are interposed between ground and the input gates G of the transistors 38 and 40. These operate to absorb any transients that may occur at the input gates. The source terminals S of the power transistors are connected to electrical ground.

The power transformer 42 is a bifilarly wound, toroidal ferrite-core transformer, which is selected in order to obtain as low a leakage inductance as possible. Such a transformer is also a very nearly ideal transformer; that is, its output voltage is very nearly exactly proportional to the input voltage, which is the sum of the voltages provided by the power transistors through the center tap 42a on the primary winding of the transformer. Since the power transistors are driven 180 degrees out of phase with one another, and since they cause current to pass in opposite directions through the power transformer 42, the peak-to-peak voltage applied to the transformer is 24 volts. The turns ratio of the transformer is 18/260, so that the peak-to-peak voltage of the square wave output of the transformer is 780 volts.

Although the leakage inductance of the toroidal power transformer is low, it could still conceivably produce large transients which could damage the power transistors. To further avoid this possibility, a set of 12 ferrite beads 60 are placed around the connecting wire connected to the center tap 42a of the power transformer 42. The beads provide a total inductance of approximately 12 microhenries, which is sufficiently large to prevent transient current spikes in the wire during the periods in which the transistors are switching on and off, which spikes could otherwise be large enough to cause damage to the power transistors.

It should be appreciated that the transformer and the frequency are such that the transformer never saturates. This results in less power consumption in the transformer and consequently a more efficient power supply. This also results in the transformer operating silently, without emission of the high pitched tone that characterizes many prior art charging devices.

Figure 1B:
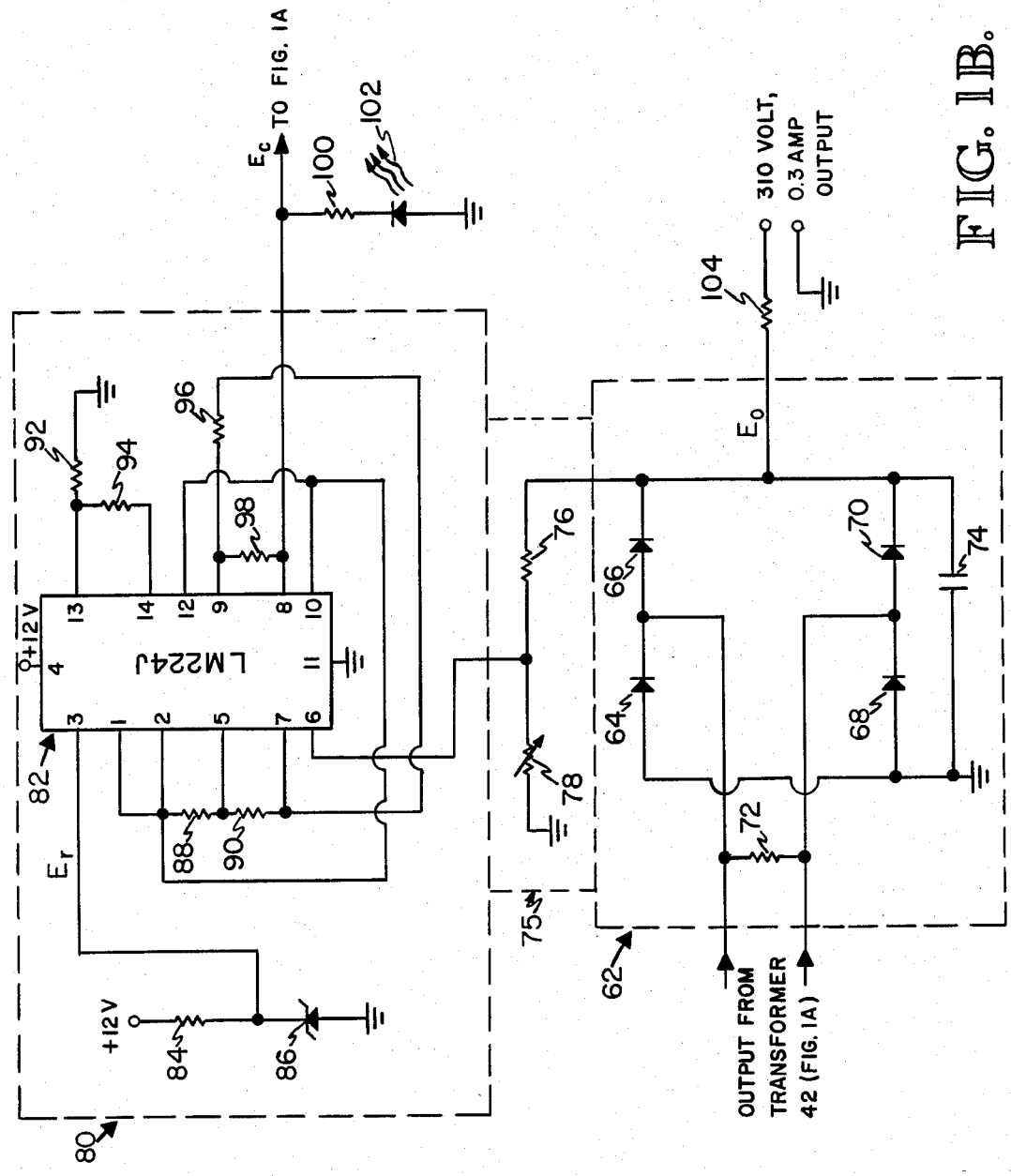

Referring to FIG. 1B, the square wave output of the power transformer is rectified by means of a full wave diode bridge circuit 62. The bridge circuit 62 includes four fast reverse recovery rectifier diodes 64, 66, 68 and 70, which in the preferred embodiment are each a IN4937 diode. The input signals to the rectifier circuit 62 are connected across a 100 kilohm, 2 watt resistor 72. The rectified output signal $E_o$ is filtered with a 7 microfarad, 450 volt capacitor 74, which is interposed between ground and the outputs of the diode array. Such a low capacitance filter capacitor is sufficient because of the high operating frequency of the system.

The rectified and filtered output signal $E_o$, which is on the order of 310 volts and can provide as much as 0.3 amperes, is applied to a voltage divider 75 that consists of a 10 megohm resistor 76 and a 500 kilohm potentiometer 78 connected in series to ground. The voltage divider is adjusted to produce an output signal of 4.7 volts when the power signal is at a voltage of 310 volts.

The signal from the voltage divider 75 is applied to a voltage comparator circuit 80 that includes an LM224J quad operational amplifier array integrated circuit 82. This array includes in a single integrated circuit four operational amplifiers, which operate in a conventional manner and which are referred to here as the first through fourth operational amplifiers. In the circuit 80 the output signal from the voltage divider is compared with a 4.7 volt reference signal $E_r$, which is provided by a voltage reference source consisting of a 5,000 ohm resistor 84 and a LM103-4.7 voltage reference generator 86, which are connected in series between ground and the +12 volt power supply signal. The 4.7 volt reference signal $E_r$ is applied to an input (pin 3) of the first operational amplifier of the IC 82. The output of this amplifier (pin 1) provides a low impedance, buffered reference signal, which is applied through a 10 kilohm resistor 88 to one input (pin 5) of the second operational amplifier in the IC array. The other input to the second operational amplifier is the signal from the voltage divider 75. These signals are compared in the second operational amplifier. This second amplifier is adjusted to have a one percent hysteresis by means of a 500 kilohm resistor 90 interposed between the negative input (pin 5) and the positive input (pin 6) of the second amplifier. When the voltage divider output signal is greater by more than one percent than the 4.7 volt buffered reference signal, the second, or comparator amplifier goes high on the output pin 7, and when the voltage divider output is lower than the 4.7 volt reference signal the comparator amplifier produces an output signal which is negative. The output signal on pin 7 of the comparator is applied through a 10 kilohm resistor 96 to the negative input (pin 9) of the third one of the operational amplifiers in the quad array 82, which is employed as an inverter to invert the comparator output signal. The inverted output signal, which is produced on pin 8 of the quad array 82, constitutes the input control signal $E_c$ that controls the electronic switch 22 (FIG. 1A). The control signal $E_c$ is also applied through a 1 kilohm resistor 100 to a light emitting diode 102, which indicates when the switch 22 is on, and thus also when the power supply is actively charging a device such as an electronic camera flash lamp.

The fourth operational amplifier in the quad array 82, which is unused, is tied to ground by means of a pair of 10 kilohm resistors 92 and 94 connected respectively to the negative input (pin 13) and the output (pin 14) of the amplifier. This arrangement ensures that the unused fourth amplifier does not draw power due to electrical noise at its positive input (pin 12), which is connected to the output (pin 1) of the buffer amplifier.

The 310 volt, 0.3 amp output signal $E_o$ of the voltage converter is fed through a 300 ohm, 20 watt resistor 104, which operates to prevent shorting of the output in the case, for example, of a defective flash unit.

The voltage converter thus far described above is capable of providing a recharge power output of approximately 100 watt-seconds/second. Such a charging capability enables a professional-quality camera flash system to be assembled from one or several inexpensive flash units.

One of the primary advantages of the power supply is that it enables one to use an inexpensive electronic flash at a much faster flash rate than is possible with previously available power supplies. A typical electronic flash used with this invention can be flashed every 1.8 seconds, in contrast with the charging period of approximately 15 seconds that is characteristic of other electronic flash power supplies. Also, as many as 7 flash heads can be powered at once by the power supply of the present invention. The voltage converter is capable of charging the flash head an average of approximately 300 times before it must itself be recharged. The rechargeable gel cell batteries used in the present invention are relatively inexpensive and may be recharged on the order of 200 to 300 times. In this regard, it is noted that some commercially available power supplies use 510-volt batteries which are capable of recharging a flash head approximately 1,000 times, but which are non-rechargeable and cost approximately three times as much as the gel cell batteries used in the present invention.

The entire voltage converter, including batteries, may be easily packaged in a compact case to form a unit weighing less than two pounds and no larger in size than a paperback book.

The foregoing description of the preferred embodiment of the invention has been presented for the purpose of illustration and to enable one of ordinary skill in the art to make and use the invention. Various modifications, alterations and substitutions which may be apparent to one of ordinary skill in the art may be made without departing from the spirit of the invention. Accordingly, the scope of the patent protection sought is defined by the following claims.

The embodiments of the invention for which patent protection is claimed are as follows:

1. A dc-dc voltage converter suitable for charging rechargeable capacitor-based devices, particularly electronic camera flash lamps, comprising:
   pulse train generator means operable to produce a pair of high frequency pulse train signals which are approximately 180 degrees out of phase with respect to one another;
   a pair of high frequency metal oxide semiconductor field effect power transistors, said pulse train signals from said pulse train generator means being applied to the respective input gates of said high frequency power transistors;
   a power transformer having a primary coil and a secondary coil, and a center tap connected to said primary coil which is connected through a center tap conductor to a source of dc current, the opposite ends of said primary coil being connected to the respective drain terminals of said power transistors;
   rectifier means coupled to said secondary coil of said transformer for rectifying the alternating current produced in said secondary coil to thereby provide a dc output signal; and
   a battery-saving circuit including means for generating an internal voltage reference signal, comparator means for comparing the voltage of said reference signal with the voltage of said dc output signal of said rectifier means, and switching means controlled by said comparator operable to switch off said converter when the output voltage of said converter exceeds the voltage of said reference signal by more than a predetermined amount.

2. A dc-dc voltage converter suitable for charging capacitance-based electrical storage devices such as those used in electronic camera flash lamps, comprising:
   a power transformer having a primary coil and a secondary coil and further including a center tap on said primary coil connected to a source of low voltage dc current;
   a pair of high frequency metal oxide semiconductor field effect power transistors having their output drains connected to the respective ends of said primary coil of said transformer;
   signal generator means operable to produce a pair of pulse train signals which are substantially 180 degrees out of phase with one another, said pulse train signals being applied to the respective input gates of said power transistors such that said transistors draw said low voltage dc current through said primary coil in alternating directions in a push-pull arrangement, said pulse train signals having a frequency which is sufficiently high to prevent saturation of said transformer at all times during operation;
   rectifier means for rectifying the alternating current produced in said secondary coil of said transformer to produce a high voltage dc output signal; and
   a battery-saving circuit including means for generating an internal voltage reference signal, comparator means for comparing the voltage of said reference signal with the voltage of said dc output signal of said rectifier means, and switching means controlled by said comparator operable to switch off said converter when the output voltage of said converter exceeds the voltage of said reference signal by more than a predetermined amount.

3. A dc-dc voltage converter suitable for charging rechargeable capacitor-based devices, particularly electronic camera flash lamps, comprising:
   pulse train generator means operable to produce a pair of high frequency pulse train signals which are approximately 180 degrees out of phase with respect to one another;
   a pair of high frequency metal oxide semiconductor field effect power transistors, said pulse train signals from said pulse train generator means being applied to the respective input gates of said high frequency power transistors;
   a power transformer having a primary coil and a secondary coil, and a center tap connected to said primary coil which is connected through a center tap conductor to a source of dc current, the opposite ends of said primary coil being connected to the respective drain terminals of said power transistors, one or more ferrite beads connected to said center tap of said primary coil of said transformer, whereby sufficient inductance is provided to said center tap conductor to prevent development of transient current spikes in said primary coil; and
   rectifier means coupled to said secondary coil of said transformer for rectifying the alternating current produced in said secondary coil to thereby provide a dc output signal.

4. A dc-dc voltage converter suitable for charging rechargeable capacitor-based devices, particularly electronic camera flash lamps, comprising:
   pulse train generator means operable to produce a pair of high frequency pulse train signals which are approximately 180 degrees out of phase with respect to one another;
   a pair of high frequency metal oxide semiconductor field effect power transistors, said pulse train signals from said pulse train generator means being applied to the respective input gates of said high frequency power transistors, each of said power transistors being protected against voltage excursions by means of a zener diode and a snubber network interposed in parallel between electrical ground and the drain terminal of said power transistor, each of said snubber networks including a low resistance resistor and a low capacitance capacitor connected in series, and wherein each of said power transistors is further protected against transient voltage excursions by means of a zener diode interposed between electrical ground and the input gate of the transistor;
   a power transformer having a primary coil and a secondary coil, and a center tap connected to said primary coil which is connected through a center tap conductor to a source of dc current, the opposite ends of said primary coil being connected to the respective drain terminals of said power transistors; and
   rectifier means coupled to said secondary coil of said transformer for rectifying the alternating current produced in said secondary coil to thereby provide a dc output signal.

5. A dc-dc voltage converter suitable for charging capacitance-based electrical storage devices such as those used in electronic camera flash lamps, comprising:
a power transformer having a primary coil and a secondary coil and further including a center tap on said primary coil connected to a source of low voltage dc current, one or more ferrite beads connected to said center tap of said primary coil of said transformer, whereby sufficient inductance is provided to said center tap conductor to prevent development of transient current spikes in said primary coil;
a pair of high frequency metal oxide semiconductor field effect power transistors having their output drains connected to the respective ends of said primary coil of said transformer;
signal generator means operable to produce a pair of pulse train signals which are substantially 180 degrees out of phase with one another, said pulse train signals being applied to the respective input gates of said power transistors such that said transistors draw said low voltage dc current through said primary coil in alternating directions in a push-pull arrangement, said pulse train signals having a frequency which is sufficiently high to prevent saturation of said transformer at all times during operation; and
rectifier means for rectifying the alternating current produced in said secondary coil of said transformer to produce a high voltage dc output signal.

6. A dc-dc voltage converter suitable for charging capacitance-based electrical storage devices such as those used in electronic camera flash lamps, comprising:
a power transformer having a primary coil and a secondary coil and further including a center tap on said primary coil connected to a source of low voltage dc current;
a pair of high frequency metal oxide semiconductor field effect power transistors having their output drains connected to the respective ends of said primary coil of said transformer, each of said power transistors being protected against voltage excursions by means of a zener diode and a snubber network interposed in parallel between electrical ground and the drain terminal of said power transistor, each of said snubber networks including a low resistance resistor and a low capacitance capacitor connected in series, and wherein each of said power transistors is further protected against transient voltage excursions by means of a zener diode interposed between electrical ground and the input gate of the transistor;
signal generator means operable to produce a pair of pulse train signals which are substantially 180 degrees out of phase with one another, said pulse train signals being applied to the respective input gates of said power transistors such that said transistors draw said low voltage dc current through said primary coil in alternating directions in a push-pull arrangement, said pulse train signals having a frequency which is sufficiently high to prevent saturation of said transformer at all times during operation; and
rectifier means for rectifying the alternating current produced in said secondary coil of said transformer to produce a high voltage dc output signal.

* * * * *